United States Patent [19]

Mitchell

[11] Patent Number: 4,534,707
[45] Date of Patent: Aug. 13, 1985

[54] HYDROSTATIC VEHICLE CONTROL

[75] Inventor: Randall M. Mitchell, Washington, Ill.

[73] Assignee: Caterpillar Tractor Co., Peoria, Ill.

[21] Appl. No.: 609,675

[22] Filed: May 14, 1984

[51] Int. Cl.³ ............................................. F04B 49/00
[52] U.S. Cl. ...................................... 417/34; 60/431; 60/445; 417/218; 417/222
[58] Field of Search ............... 60/431, 432, 445, 447, 60/449, 420; 417/216, 218-222, 18, 22, 34

[56] References Cited

U.S. PATENT DOCUMENTS

| | | | |
|---|---|---|---|
| 3,788,775 | 1/1974 | Leutner et al. | 417/222 |
| 3,890,360 | 6/1975 | Pruvot et al. | 60/431 |
| 4,074,955 | 2/1978 | Nonnemacher et al. | 417/218 |
| 4,103,489 | 8/1978 | Fletcher et al. | 60/449 |
| 4,248,194 | 2/1981 | Drutchas et al. | 417/22 X |
| 4,395,199 | 7/1983 | Izumi et al. | 417/53 |
| 4,459,806 | 7/1984 | Falk | 60/449 |

FOREIGN PATENT DOCUMENTS

WO79/00036 2/1979 PCT Int'l Appl. .
1258591 12/1971 United Kingdom .
2068512 8/1981 United Kingdom .

Primary Examiner—Edward K. Look
Attorney, Agent, or Firm—Terry D. Morgan

[57] ABSTRACT

An apparatus for regulating the speed of internal combustion engine of a hydrostatic system. A fuel control means acts to control the quantity of fuel delivered to the engine responsive to the immediate hydraulic flow demanded by operation of the hydrostatic system. The speed of the engine is set to one of a plurality of discrete levels in response to the required flow being within one of a corresponding plurality of preselected ranges.

13 Claims, 7 Drawing Figures

Fig. 1

HYDROSTATIC VEHICLE CONTROL

DESCRIPTION

1. Technical Field

This invention relates generally to a control system for a hydrostatic vehicle, and more particularly to an electronic device for controlling engine speed and hydraulic pump displacement in response to loads subjected on a hydrostatic vehicle.

2. Background Art

In the field of hydrostatic vehicles, for example, excavators, variable displacement hydraulic pumps are typically driven by a prime mover, providing hydraulic power to a plurality of work implements as well as to the drive system. Excavators, being extremely versatile machines, are useful in performing a large number of different and varied tasks (e.g. pipelaying, mass excavation, trenching, logging, etc.), each task having its own unique hydraulic flow and pressure requirements. For example, during mass excavation, hydraulic power requirements are quite high with brief periods of reduced need, but in pipelaying, sustained periods of low flow during waiting are common with sessions of moderate to high flow.

Prior art has shown that a substantial fuel savings can be realized by reducing engine speed to low idle during these sustained periods of waiting. While this method does address the most obvious area for fuel savings, it is silent on the possibility of conserving fuel during active times where less than maximum engine speed and pump flow would be required. For example, U.S. Pat. No. 4,395,199, issued to Izumi et al. on July 26, 1983, discloses an electronic control system for a hydraulic excavator which controls swash plate inclination on a variable displacement pump in response to operator input via a control lever. In this way, the system provides the hydraulic flow requested by the operator, reduces load on the engine during periods of less than maximum power requirements and, subsequently, reduces fuel consumption. Although the system does save fuel, it will not minimize fuel requirements, due primarily to the inefficiencies resulting from operation of the hydraulic pumps at reduced displacement and continued operation of the engine at a single, compromising revolutionary speed. While the operator could manually adjust engine speed to maintain pump displacement relatively high during actual working, it is recognized that operation of an excavator requires the operator use both hands and both feet. In view of the fact that a majority of excavator operators lack a useful fifth limb, manual adjustment of engine speed is necessarily given a rather low priority.

The present invention is directed to overcoming one or more of the problems as set forth above.

DISCLOSURE OF THE INVENTION

In accordance with one aspect of the present invention, an apparatus for controlling an internal combustion engine having a rack for controlling a fuel injection pump, and at least one variable displacement hydraulic pump. The apparatus includes a first means which delivers a first signal responsive to the flow demanded of said variable displacement hydraulic pump. A control means receives the first signal and delivers a desired engine speed signal responsive to the magnitude of the first signal. A fuel control means receives the desired engine speed signal and delivers a signal responsive to the magnitude of the desired engine speed signal. A rack actuator means receives the signal and controls the supply of fuel to the engine, responsive to the magnitude of the fifth signal.

BEST MODE FOR CARRYING OUT THE INVENTION

Figure 1:
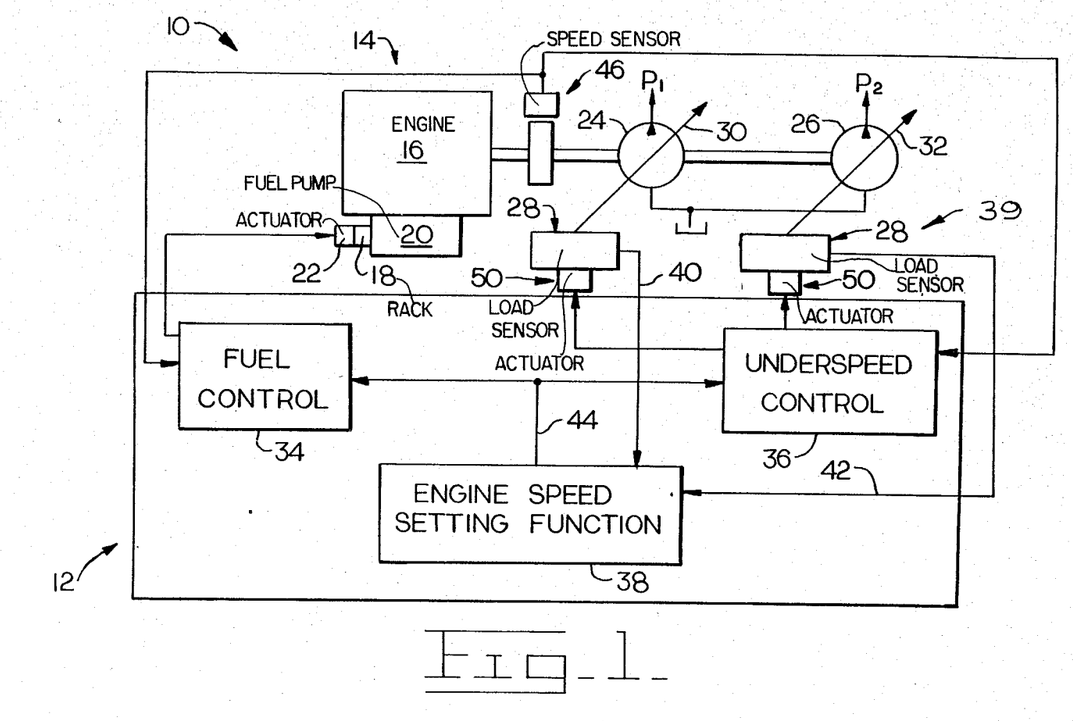
FIG. 1 illustrates in block diagrammatic form a hydrostatic control system, engine, and hydraulic pump arrangement.

Referring now to the drawings, wherein a preferred embodiment of the present apparatus 10 is shown, FIG. 1 illustrates an electronic control system 12 for a prime mover 14, preferably being an internal combustion engine 16 controlled by a rack 18 of a fuel injection pump 20. The rack 18 is positioned by a known electrohydraulic rack actuator means 22 under direction from the control system 12. Variable displacement hydraulic pumps 24,26 are driven by the engine 16 while a hydromechanical load sensing apparatus 28 (shown in greater detail in FIG. 2 and discussed later in this specification), controls inclination of the swash plates 30,32 in response to detected hydraulic load. The control system 12 can be divided into three major components: fuel control means 34, underspeed control means 36, and control means 38.

The control means 38 receives first signals from a first means 39 over lines 40,42 responsive to the displacements of each of the hydraulic pumps 24,26, computes a desired engine speed responsive to the first signal of greatest magnitude, and delivers a third signal via a line 44 representative of the desired engine speed to both the fuel control means 34 and the underspeed control means 36. A second means 46 detects the actual rotational speed of the engine 16 and delivers a second signal indicative of the actual engine speed to both the fuel and underspeed control means 34,36. The fuel control means 34 receives the second and third signals representing actual and desired engine speed, respectively, compares the two signals, and delivers a fifth signal in response to the desired engine speed being less than actual engine speed. A rack actuator means 22 receives the fifth signal and controls the supply of fuel to the engine 16 responsive to the magnitude of the fifth signal. Similarly, the underspeed control means 36 receives the second and third signals, compares the two signals, and delivers a fourth signal in response to the desired engine speed being greater than the actual engine speed. A swash plate actuator means 50 receives the fourth signal and controls the angle of inclination of the swash plate responsive to the magnitude of the fourth signal. More simply stated, when actual engine speed "lugs" below desired engine the underspeed control means 36 acts to reduce pump displacement and allow the engine speed to increase under lower load constraints. Should the actual engine speed rise above desired speed, the fuel control means will reduce the supply of fuel to the engine allowing the engine to slow to a more efficient operating point.

Figure 2:
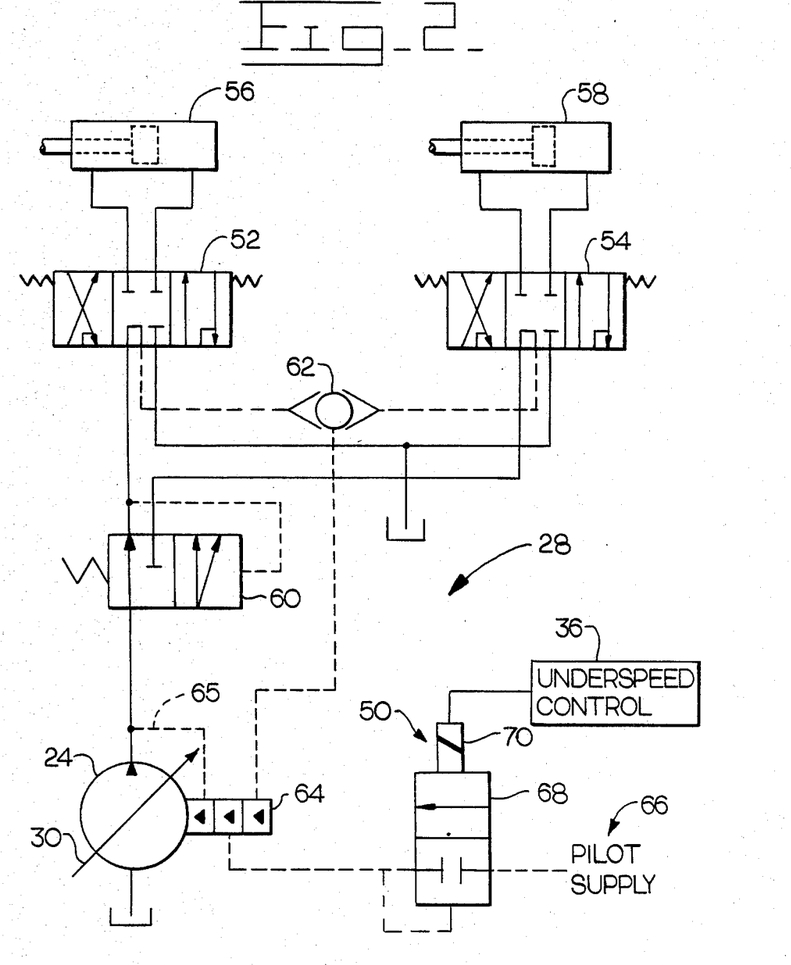
FIG. 2 illustrates a load sensing means for controlling swash plate inclination.

FIG. 2 illustrates one embodiment of a hydromechanical load sensing apparatus 28. The apparatus 28 includes the hydraulic pump 24 with positionable swash plate 30, a plurality of operator actuated valves 52,54 for respectively controlling hydraulic fluid flow to a plurality of work implements 56,58, a flow priority control valve 60, and a ball resolver valve 62 for delivering a load pressure signal of greatest magnitude to the swash plate actuator 64. The flow priority control valve 60 operates to give the implement 56 priority of hydraulic fluid flow over the implement 58. Fully actuating the valve 52 causes the control valve 60 to be biased in a direction where all hydraulic flow is directed to the implement 56. Alternatively, not actuating the valve 52 results in a pressure signal biasing the flow control valve 60 in the opposite direction and thereby directs flow to the valve 54. Varying degrees of operation of the valve 52 result in an appropriate quantity of flow being delivered to the implement 56 with the remaining flow available to the implement 58. The ball resolver valve 62 receives load pressure signals from each of the valves 52,54 corresponding to the load applied to the implement cylinders. The signal of greatest magnitude is passed to the swash plate actuator 64 where the position of the swash plate 30 is set corresponding to the magnitude of the signal. A pump discharge pressure signal is also delivered via line 65 to the swash plate actuator 64 for maintaining pump output pressure at, for example, a 300 psi differential above that requested by the load pressure signal.

Electronic control of the load sensing apparatus 28 is obtained by the use of a pilot supply 66, proportional pressure valve 68, and a solenoid 70. The proportional valve 68 controls the pressure of the pilot supply 66 delivered to the swash plate actuator 64. Operation of the solenoid 70 under direction from the underspeed control means 36 regulates the proportional pressure valve 68 controls the pressure delivered to the swash plate actuator 64, and consequently effects the swash plate's position.

For example, during operation of the excavator, assume desired engine speed equals actual engine speed; therefore, the underspeed control means 36 will take no action to alter swash plate position. Should actual engine speed drop below desired engine speed, the load sensing apparatus will continue to increase pump displacement to provide the requested flow; however, the underspeed control means 36 will act to reduce pump displacement by actuating the solenoid 70 and providing an underspeed pressure signal to the swash plate actuator 64. The magnitude of the underspeed pressure signal is varied by the underspeed control means 36 as a function of the difference between desired and actual engine speed (discussed in greater detail later in this text).

Figure 3:
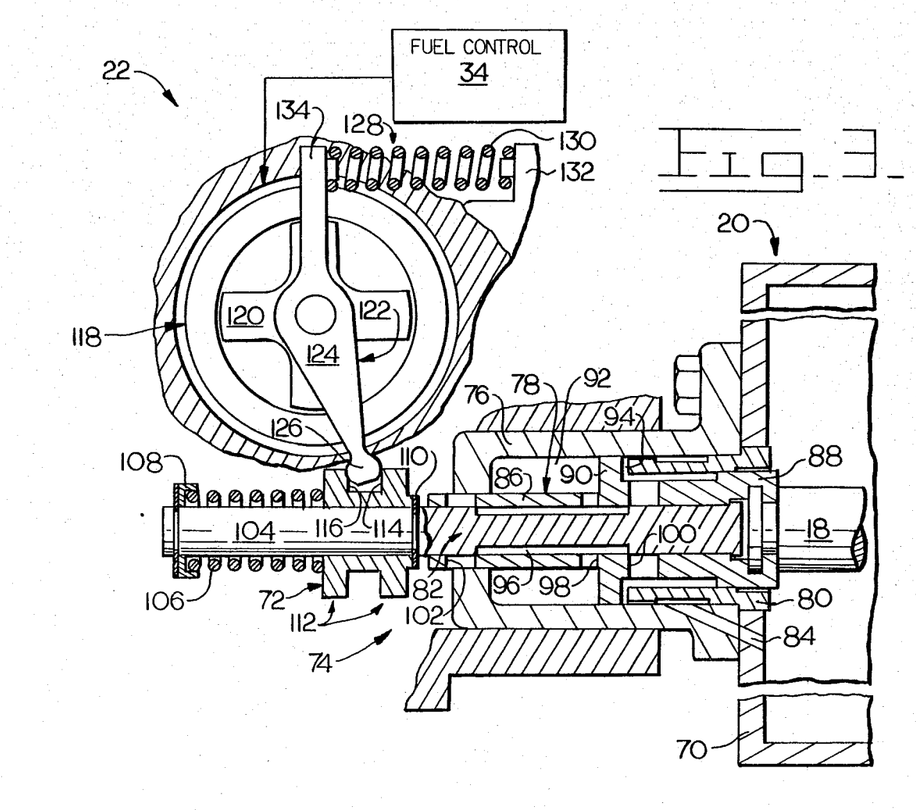
FIG. 3 illustrates a fuel injection pump actuator partly in sectional detail and partially in block diagrammatic form.

FIG. 3 shows an electrohydraulic rack actuator means 22 for controllably positioning a rack 18 of a fuel injection pump 20. As is conventional, the fuel injection pump 20 includes a fuel injection pump housing 70 and a reciprocating fuel rack 18 axially movable in opposite fuel-increasing and fuel-decreasing directions (shown in FIG. 3 as being to the left and to the right, respectively).

The actuator means 22 further includes a rack control member 72 which is also movable in opposite fuel-increasing the fuel-decreasing directions. In the particular system illustrated herein, the rack control member 72 is in the form of an annular sleeve or collar. A hydraulic servo system 74 is provided to function as a means for moving the fuel rack 18 in its fuel-increasing and fuel-decreasing directions in response to corresponding movements of the rack control member 72 and with a force greater than that required to move the rack control member 72. The hydraulic servo system 74 particularly illustrated herein includes a cylinder 76, a piston 78, a sleeve 80, and a pilot valve spool 82.

The cylinder 76 is secured to the fuel injection pump housing 70 and has a passage 84 communicating with the interior of the pump housing 70 through which pressurized engine lubricating oil may flow. The piston 78, which is ported and stepped and connected to the fuel rack 18 for axial movement therewith, is disposed for axial movement in the cylinder 76. The diameter of the left end 86 of the piston 78 is less than the diameter of the right end 88 of the piston 78 which slides in the sleeve 80 fixed within the cylinder 76, and both such diameters are less than that of the intermediate piston head 90. The left end 86 of the piston 78, the piston head 90, and the cylinder 76 define an annular chamber 92. The piston head 90 has an annular surface 94 on the right side thereof.

The pilot valve spool 82 is mounted within the piston 78 for limited axial movement relative thereto, and has a reduced diameter recess 96 in continuous communication with piston ports 98. The axial length of the recess 96 is sized relative to the piston ports 100 and 102 such that the recess 96 does not communicate with either of the piston ports 100 and 102 when the pilot valve spool 82 is in the balanced position of FIG. 3, but will communicate with the piston ports 100 or 102 when moved to the right or the left, respectively, relative to the piston 78.

The rack control member 72 is mounted for limited axial sliding movement on the left end stem 104 of the pilot valve spool 82. The rack control member 72 is biased towards the right by a spring 106 which shoulders against a spring retainer 108, with rightward movement of the rack control member 72 being limited by a retainer clip 110 fixed to the pilot valve spool stem 104. The rack control member 72 has a pair of radially extending flanges 112 on one side thereof to provide a pair of oppositely facing shoulders 114 and 116.

An electrically energizable brushless direct current torque motor 118 is mounted in fixed relation to the cylinder 76 of the servo system 74, the motor 118 has a rotatable rotor 120 movable in opposite fuel-increasing and fuel-decreasing directions. It is a functional characteristic of such a torque motor 118 that its rotor 120 will turn freely in its bearings when no electrical current is supplied to the motor 118. When electrical current is applied, the rotor 120 will exert a preselected torque in one direction, the degree of torque being proportional to the amount of the current applied. In the preferred embodiment, applied current is controlled by regulating the duration of the applied signal as detailed later in this text.

A coupling means 122 is provided for connecting the rotor 120 of the torque motor 118 to the rack control member 72 to move the rack control member 72 in one of its fuel-increasing or fuel-decreasing directions in response to movement of the rotor 120 in its corresponding fuel-increasing or fuel-decreasing direction. In the particular system shown herein, the coupling means 122 comprises a control lever 124 fixed to the rotor 120 and having a free end 126 confined between the shoulders 114,116 of the rack control member 72.

In the system illustrated in FIG. 3, the torque motor 118 is arranged so that current applied thereto will cause a torque to be exerted on the control lever 124, urging it to move in a clockwise, fuel-increasing direction, in turn urging the rack control member 72 in its leftward, fuel-increasing direction. A bias means 128 is provided for biasing the rack control member 72 in a direction opposite to the direction that the coupling means 122 will move the rack control member 72 when the torque motor 118 is energized. In the particular rack actuator means 22 shown in FIG. 3, the bias means 128 comprises a low rate compression spring 130 confined between a fixed spring seat 132 and an extension 134 of the control lever 124. With this arrangement, the spring 130 biases control lever 124 in its fuel-decreasing direction, with the free end 126 of control lever 124 acting on the shoulder 114 of the rack control member 72 to bias such rack control member 72 for movement in its fuel-decreasing direction.

Figure 4:
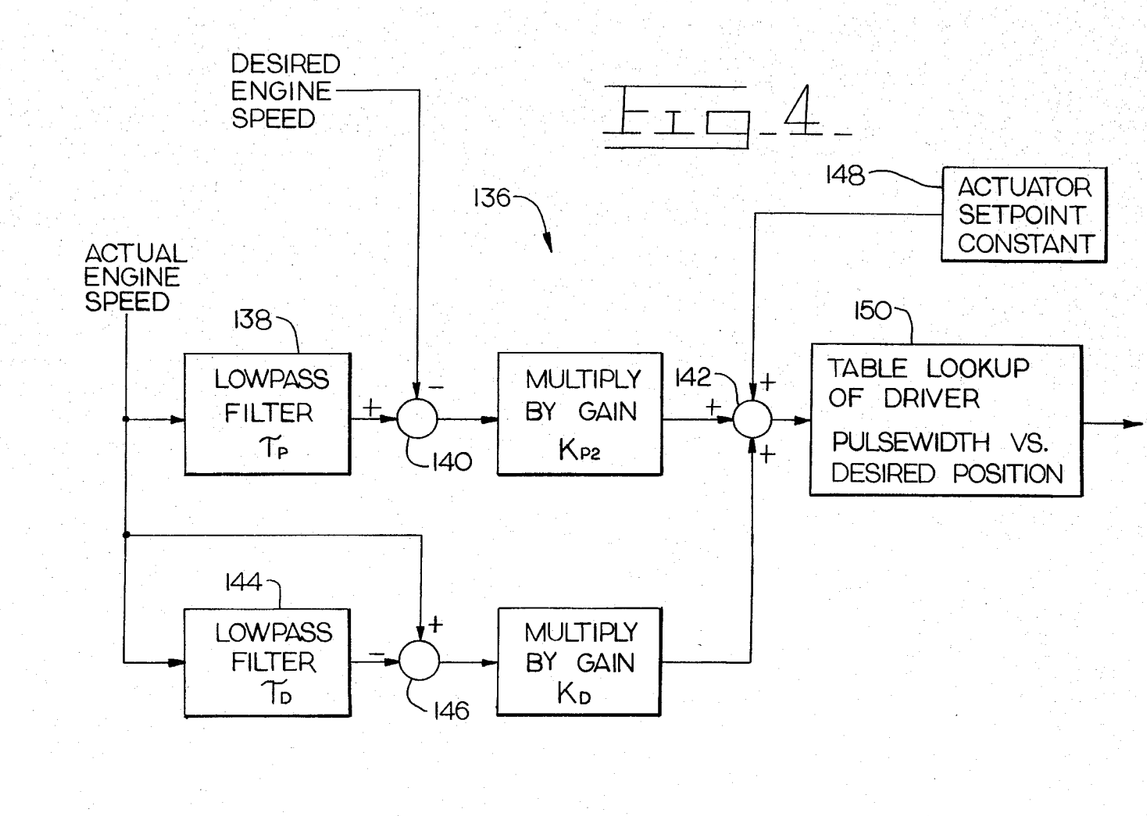
FIG. 4 is a block diagram explanation of an embodiment of the pump control method.

Operation of the underspeed control means is illustrated in block diagram form by FIG. 4. One implementation of the underspeed control means 36 is shown as a first proportional plus derivative feedback means 136 for controlling the magnitude of the fourth signal and thereby control hydraulic pump displacement. The actual engine speed signal is received from the second means 46 and delivered to a low pass filter 138, eliminating transients associated with individual cylinder ignition. The filtered engine speed signal is then delivered to a first summing means 140 where it is added to a negative representation of the desired engine speed signal. The resulting signal is indicative of an error signal or the difference between the actual and desired engine speed. The error signal is then multiplied by a first preselected coefficient $K_{p2}$ and delivered to a second summing means 142 as the proportional term of the control equation. Simultaneously, the actual engine speed signal is delivered to a second low pass filter 144 and passed to a negative input of a third summing means 146. A positive input of the third summing means 146 receives the unfiltered actual engine speed signal; and resultingly, the third summing means delivers a signal based on the difference between the filtered and unfiltered signals, and more particularly a signal indicative of rate of change of engine speed or the derivative of actual engine speed. The derivative signal is multiplied by a second coefficient $K_D$ and delivered to the second summing means 142. A first actuator setpoint means 148 delivers a seventh signal of constant magnitude representative of a maximum angle of inclination of the swash plate to the second summing means 142. The second summing means 142 adds the proportional, derivative, and constant signals and delivers this sum as an eighth signal for controlling the magnitude of the fourth signal. A processing means 150 receives the eighth signal and accesses a preselected memory location indicative of the magnitude of the fourth signal. A software table look-up routine determines the magnitude of the eighth signal and retrieves a binary number from a memory location determined by the magnitude of the eighth signal. The binary number determines the duration of the fourth signal and; consequently, controls the hydraulic pump displacement. For example, retrieving the number 00000000 would result in delivering a fourth signal of minimum pulse width and retrieving the number 11111111 causes the processing means to deliver a pulse width of maximum duration. Binary numbers of varying magnitude between the two extremes result in pulse widths of corresponding variable duration. Those skilled in the art of electronic design will recognize that the implementation of the proportional plus derivative feedback control equation, as shown in FIG. 4, could be implemented as a hardware arrangement, a software program, or a combination of the two. For example, low pass filters are commonly available hardware circuits and software configurations of low pass filters are also known in the art. Similarly, summing means can be provided by either software or hardware.

From the above description, one can see that during operation of the electronic control system 12 when actual engine speed is above desired engine speed, the underspeed control means 36 will deliver an eighth signal calling for a pump displacement greater than the maximum pump displacement. An eighth signal requesting a pump displacement greater than maximum will have no additional affect on pump displacement as the pump can supply no more than the maximum. Consequently, the underspeed control means will act to alter the pump displacement only when actual speed "lugs" below desired speed.

Figure 5:
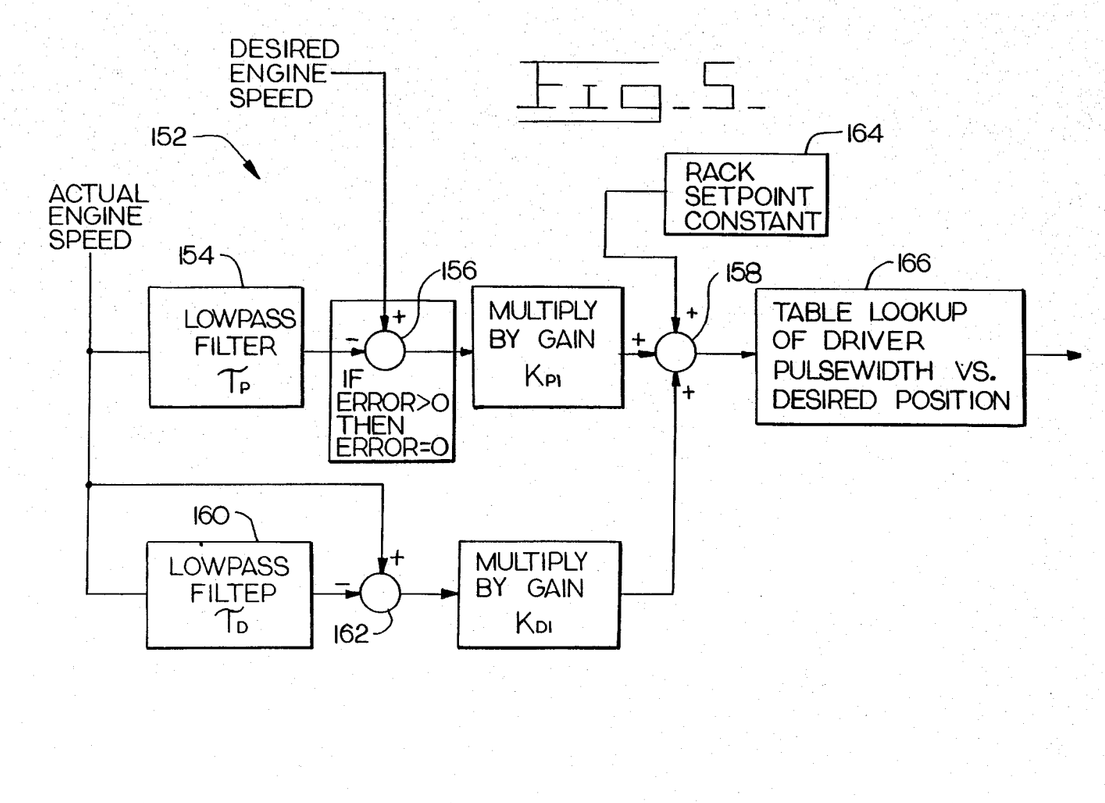
FIG. 5 a block diagram explanation of an embodiment of the fuel control method.

Operation of the fuel control means 34 is illustrated in block diagram form by FIG. 5. One implementation of the fuel control means 34 is shown to be similar to the underspeed control means 36, in that a second proportional plus derivative feedback means 152 controls the magnitude of the fifth signal and thereby controls the supply of fuel to the engine.

The actual engine speed signal is received from the second means 46 and delivered to the negative input of a third low pass filter 154. The filtered engine speed signal is then delivered to a fourth summing means 156 where it is added to the desired engine speed signal. The resulting signal is, once again, indicative of an error signal or the difference between the actual and desired engine speed, but opposite in sign to the corresponding error signal in the underspeed control means. The error signal is then multiplied by a third preselected coefficient $K_{P1}$ and delivered to a fifth summing means 158 as the proportional term of the control equation. Simultaneously, the actual engine speed signal is delivered to a fourth low pass filter 160 and passed to a negative input of a sixth summing means 162. A positive input of the sixth summing means 162 receives the unfiltered actual engine speed signal; and resultingly, the sixth summing means 162 delivers a signal based on the derivative of actual engine speed. The derivative signal is multiplied by a fourth coefficient $K_{D1}$ and delivered to the fifth summing means 158. A second actuator setpoint means 164 delivers a tenth signal of constant magnitude representative of a maximum allowable rack position to the fifth summing means 158. The fifth summing means 158 adds the proportional, derivative, and constant signals and delivers this sum as an eleventh signal for controlling the magnitude of the fifth signal. A processing means 166 receives the eleventh signal and accesses a preselected memory location indicative of the magnitude of the fifth signal. A software look-up routine determines the magnitude of the eleventh signal and retrieves a binary number from a memory location determined by the magnitude of the eleventh signal, as described in the operation of the underspeed control means 36. The binary number determines the duration of the fifth signal and; consequently, controls the rack position and fuel supply.

Operation of the fuel control means 34 is similar to that of the underspeed control means 36 except for the difference in sign of the proportional term. With the constant term being set to call for maximum rack, only negative proportional terms will have an influence on reducing rack position, or more precisely, the fuel control means will act to reduce the supply of fuel when actual engine speed exceeds desired engine speed. Unlike the underspeed control means 36, calling for greater than maximum allowable rack 18 will have the result of increasing rack 18 beyond its rated position. To prevent this phenomenon from occurring, the additional step of setting the proportional term to zero in response to the actual engine speed signal being less than the desired engine speed signal has been added to the fuel control means. Checking to see if the error signal is greater than zero and setting the error to zero if the condition exists is shown as occurring subsequent to multiplying the error signal by the constant $K_{Pl}$. Should the error be less than zero, then the signal is passed unaltered.

Figure 6:
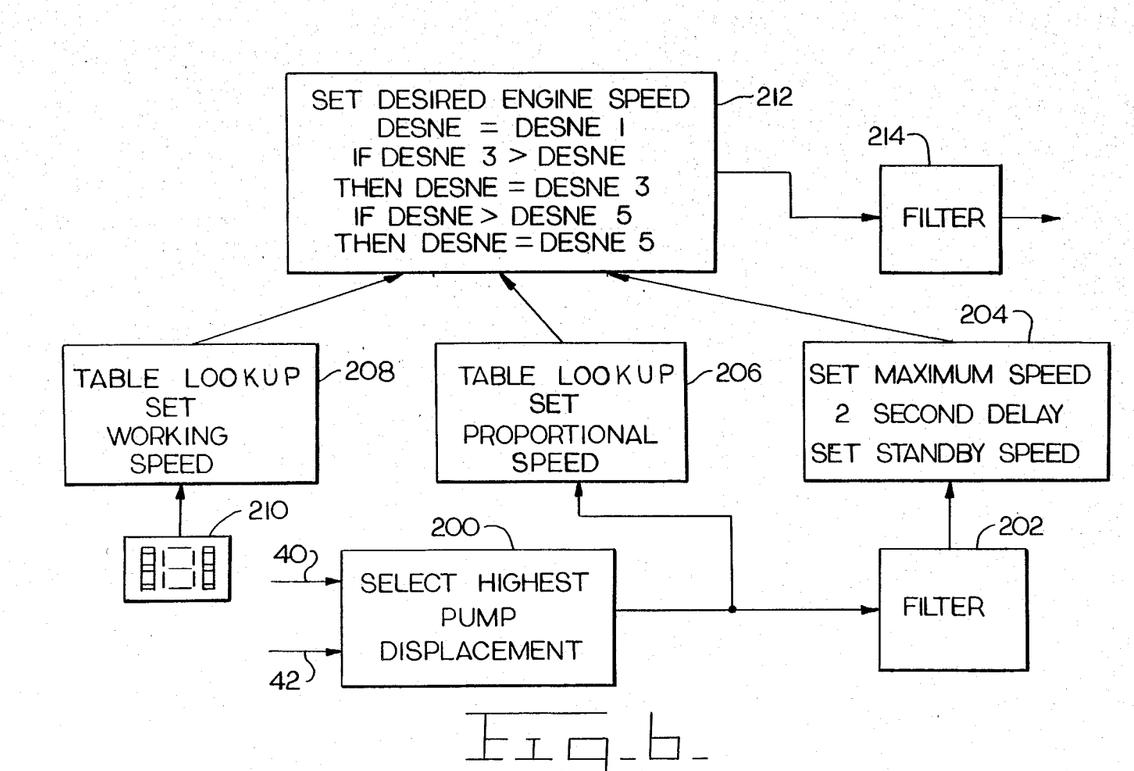
FIG. 6 a detailed block diagram explanation of the engine speed setting function; and, FIG. 7 is a diagrammatic view showing one example of the characteristic of desired engine speed with respect to hydraulic pump displacement as described in FIG. 6.
Figure 7:
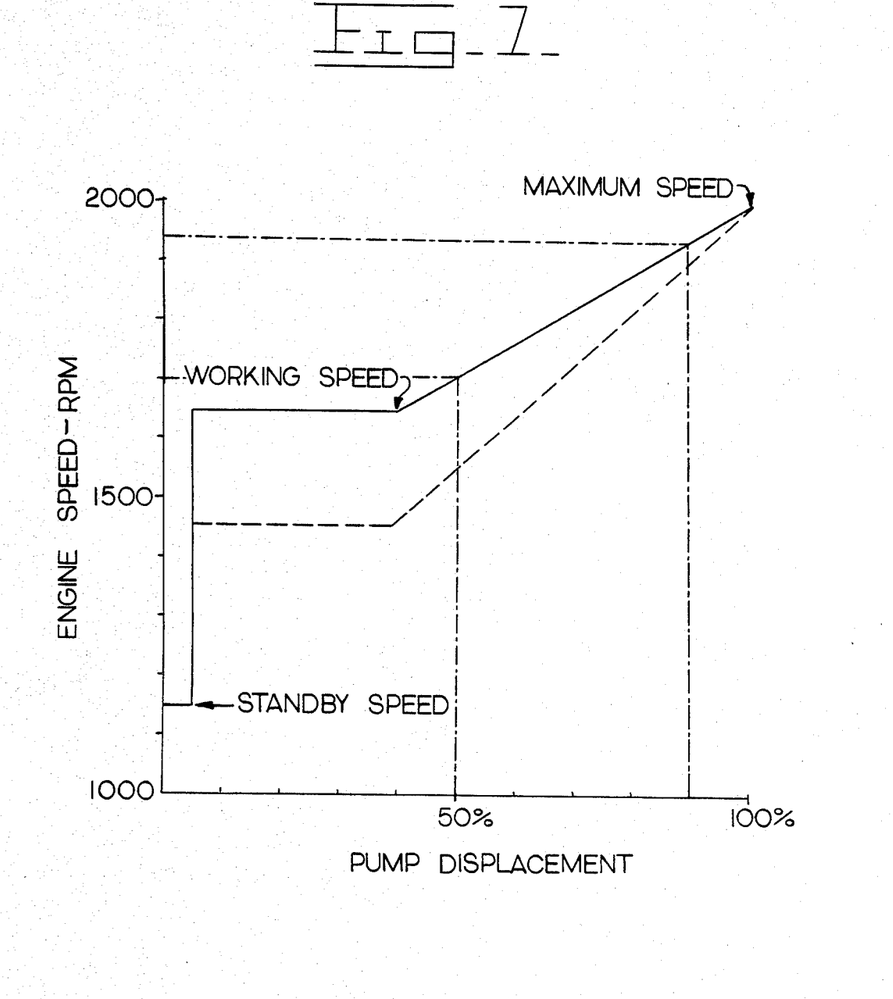

FIG. 6 illustrates the control means 38 in block diagram form and can best be explained in conjunction with the graphical representation of engine speed versus pump displacement shown in FIG. 7. As discussed earlier, the control means 38 functions to determine a desired engine speed based on the hydraulic pump displacement. While the block diagrams of FIG. 6 can be most easily explained as steps in a software routine, those skilled in the art of electronic control design recognize that either portions, or all of the software may be replaced by hardware circuitry without departing from the spirit of the present invention. FIG. 7 shows the desired engine speed signal being controllably settable to one of a plurality of preselected levels in response to the hydraulic pump displacement signal being within one of a plurality of corresponding ranges. More particularly, the desired engine speed signal is a first preselected level in response to the pump displacement signal being less than a first preselected magnitude for a preselected duration of time. For example, the desired engine speed is set to a standby speed of about 1140 rpm in response to the pump displacement being less than 5% for approximately 2 seconds. Further, the desired engine speed signal is a second preselected level in response to said pump displacement signal being in a range between the first preselected magnitude and a second preselected magnitude. More precisely, the desired engine speed is set to some operator selected working speed when pump displacement is between 5% and 40%. A third range exists where the desired engine speed signal is directly proportional to the first signal when the first signal is greater than the second preselected magnitude. The ramp portion of the graph between the working speed and a maximum speed illustrates one possible proportional curve. However, the working speed is adjustable to a plurality of discrete levels, one example being the dashed line of FIG. 7, necessitating the slope of the ramp portion be adjusted to fit between the maximum speed and the new working speed. Maximum desired engine speed is advantageously set to correspond with maximum pump displacement.

FIG. 6 illustrates one implementation of the graph of FIG. 7. Pump displacement signals are received by the block 200 for each of the pumps 24,26 over the lines 40,42. The signal of greatest magnitude is selected and delivered to the block 202 where the signal is filtered to remove transient displacements which can occur at very low pump displacement. Block 204 receives the filtered signal and sets a variable DESNE5 to one of two values. The first value corresponds to standby engine speed and will be assigned to the variable DESNE5 if the pump displacement signal falls below 5% for a period greater than two seconds. The second value corresponds to maximum desired engine speed and will be assigned to the variable DESNE5 at all times when the pump displacement signal rises above 5%.

Block 206 also receives the pump displacement signal of greatest magnitude and uses a software table look-up routine to assign a proportional desired engine speed to the variable DESNE3. The table look-up routine accesses a memory location based on the pump displacement and retrieves a desired engine speed stored there. For example, the graph of FIG. 7 shows a pump displacement of approximately 50% corresponding to a desired engine speed of about 1700 rpm. In this example, the table look-up routine would access the memory location corresponding to 50% pump displacement, retrieve the desired engine speed of 1700 rpm, and set the variable DESNE3 to 1700 rpm.

Block 208 is similar in operation to block 206 as it also employs the use of a table look-up routine to set a desired engine speed variable. The variable DESNE1 is set to a working speed in response to an operator positionable thumbwheel switch 210. The block 208 receives a signal from the thumbwheel switch 210 indicative of the operator selected level, accesses an appropriate memory location, and assigns the value stored in that memory location to the variable DESNE1.

Each of the variables DESNE1, DESNE3, DESNE5 are received by block 212 where a variable DESNE is first assigned the value contained within variable DESNE1. The variables DESNE, DESNE3 are compared and if the variable DESNE3 is greater than the variable DESNE then the variable DESNE is redefined to be equal to the variable DESNES. More simply stated, the working speed is compared to the proportional speed, if the proportional speed is greater than the working speed then desired engine speed is set to the proportional speed. The variable DESNE is then compared to the variable DESNE5 and if the variable DESNE is greater than the variable DESNE5 then the variable DESNE is redefined to be equal to the variable DESNE5. This step compares the desired engine speed, which has been set to either the working or porportional speed, to either the maximum speed or the standby speed, depending upon which value block 204 has assigned to the variable DESNE5. If the desired engine speed is greater than maximum speed, then an overspeed condition exists and the desired engine speed is redefined to be equal to the maximum speed. Alternately, if the pump displacement has been less than 5% for more than two seconds, then the variable DESNE5 has been set to standby speed. If, at this time, the desired engine speed is greater than the standby speed, then desired engine speed is redefined to be the standby speed.

The variable DESNE is delivered to a filter 214 to prevent sudden changes in engine speed. For example, with the engine running at maximum speed, should the operator discontinue an operation which requires high output then desired engine speed will change somewhat drastically in a very short period, giving the appearance of jerky operation. The filter 214 causes the desired engine speed to change more slowly and operation appears much smoother. The desired engine speed is delivered to both the fuel control and underspeed control means 34,36 as discussed earlier.

INDUSTRIAL APPLICABILITY

In the overall operation of the excavator, assume that the operator is trenching, and at this particular portion of the work cycle he is positioning the bucket to make a cut. The load experienced by the hydraulic implements 56,58 is low to moderate and the hydraulic load sensing apparatus has positioned the swash plate 30 to provide, for example, approximately 25% pump displacement. The pump displacement is detected and the control means 38 sets desired engine speed to the working speed requested by the operator.

As the bucket begins the cut, the hydraulic load on the implements 56,58 increases. The load sensing apparatus 28 responds by increasing pump displacement to approximately 90% to provide the additional flow required. A corresponding increase in desired engine speed to 1900 rpm occurs in response to the increased pump displacement, but the increased hydraulic load reduces the engine responsiveness, and the actual engine speed lugs below the desired engine speed. The underspeed control means 36 responds by stroking back the pump 30 according to the proportional plus derivative means 136 shown in FIG. 4. This reduced swash plate position is detected by the control means 38 which summarily reduces the desired engine speed signal to correspond to the new swash plate 30 position. The fuel control means 34 maintains full rack as long as desired engine speed is greater than actual engine speed. Thus, the engine is accelerating under the reduced load and the underspeed control means 36 increases swash plate position as the difference between desired and actual speed diminishes. However, as the swash plate position increases, so too does the desired engine speed signal. Judicious selection of the gains $K_{P2}$, $K_{D2}$ allow the control means 38 and the underspeed control means 36 to interact when operating on the proportional portion of the curve shown in FIG. 7, and provide the desired relationship between engine speed and pump displacement.

At the end of the cut, hydraulic load decreases, the load sensing apparatus reduces displacement, desired engine speed is reduced, and the fuel control means responds to actual engine speed being greater than desired engine speed by reducing rack displacement until desired equals actual engine speed. The first proportional plus derivative feedback means forces the fuel control means to reduce the rack position less as the difference between actual and desired engine speed becomes less at an increasing rate.

At any point during the work cycle, should the operator pause and allow the load sensing apparatus to stroke the pump displacement to less than 5% for longer than two seconds, then the control means 38 will set desired speed to the standby speed of about 1140 rpm. The fuel control means will reduce rack position and force the engine to slow actual speed to the targeted standby speed.

While the present invention has been described primarily in association with hydraulic excavators, it is recognized that the invention could be implemented on most any prime mover and hydraulic pump arrangement.

Other aspects, objects, and advantages of this invention can be obtained from a study of the drawings, the disclosure, and the appended claims.

I claim:

1. An apparatus for controlling an internal combustion engine having a rack for controlling a fuel injection pump, and at least one variable displacement hydraulic pump, the apparatus comprising:
   first means for delivering a first signal responsive to the hydraulic flow demanded of said variable displacement hydraulic pump;
   control means for receiving said first signal and delivering a desired engine speed signal responsive to the magnitude of said first signal;
   fuel control means for receiving said desired engine speed signal and delivering a signal responsive to the magnitude of said desired engine speed signal; and,
   rack actuator means for receiving said signal and controlling the supply of fuel to said engine responsive to the magnitude of said signal.

2. The apparatus, as set forth in claim 1, wherein said desired engine speed signal is controllably set to one of a plurality of preselected levels in response to said first signal being within one of a plurality of corresponding ranges.

3. The apparatus, as set forth in claim 2, wherein said desired engine speed signal is a first preselected level in response to said first signal being less than a first preselected magnitude for a preselected duration of time.

4. The apparatus, as set forth in claim 3, wherein said desired engine speed signal is a second preselected level in response to said first signal being less than a second preselected magnitude.

5. The apparatus, as set forth in claim 4, wherein said desired engine speed signal is directly proportional to said first signal in response to said first signal being greater than said second preselected magnitude.

6. The apparatus, as set forth in claim 4, wherein said second preselected level is adjustable to one of a plurality of discrete levels.

7. The apparatus, as set forth in claim 1, wherein said rack actuator means controls the quantity of fuel injected in response to the duration of said control signal.

8. The apparatus, as set forth in claim 1, including a second means for detecting the actual rotational speed of said engine and delivering a second signal responsive to said actual speed, and wherein said fuel control means receives said actual and desired engine speed signals, compares said actual and desired engine speed signals, and delivers a rack control signal in response to said actual speed signal being less than said desired speed signal.

9. An apparatus for controlling an internal combustion engine having a rack for controlling a fuel injection pump, and at least one variable displacement hydraulic pump, the apparatus comprising:
   first means for delivering a first signal responsive to the hydraulic flow demanded of said variable displacement hydraulic pump;

control means for receiving said first signal and delivering a desired engine speed signal of a first magnitude in response to said first signal being less than a first preselected magnitude for a preselected duration of time;

fuel control means for receiving said desired engine speed signal and delivering a signal responsive to the magnitude of said desired engine speed signal; and rack actuator means for receiving said signal and controlling the supply of fuel to said engine responsive to the magnitude of said signal.

10. The apparatus, as set forth in claim 9, wherein said desired engine speed signal is set at a second preselected level in response to said first signal being less than a second preselected magnitude.

11. The apparatus, as set forth in claim 10, wherein said desired engine speed signal is directly proportional to said first signal in response to said first signal being greater than said second preselected magnitude.

12. The apparatus, as set forth in claim 10, wherein said second preselected level is adjustable to one of a plurality of discrete levels.

13. The apparatus, as set forth in claim 9, including a second means for detecting the actual rotational speed of said engine and delivering a second signal responsive to said actual speed, and wherein said fuel control means receives said actual and desired engine speed signals, compares said actual and desired engine speed signals, and delivers a rack control signal in response to said actual speed signal being less than said desired speed signal.

* * * * *